Sept. 19, 1950 H. ELLIS 2,523,102
TYPOGRAPHICAL MACHINE
Filed Aug. 18, 1943 13 Sheets-Sheet 1
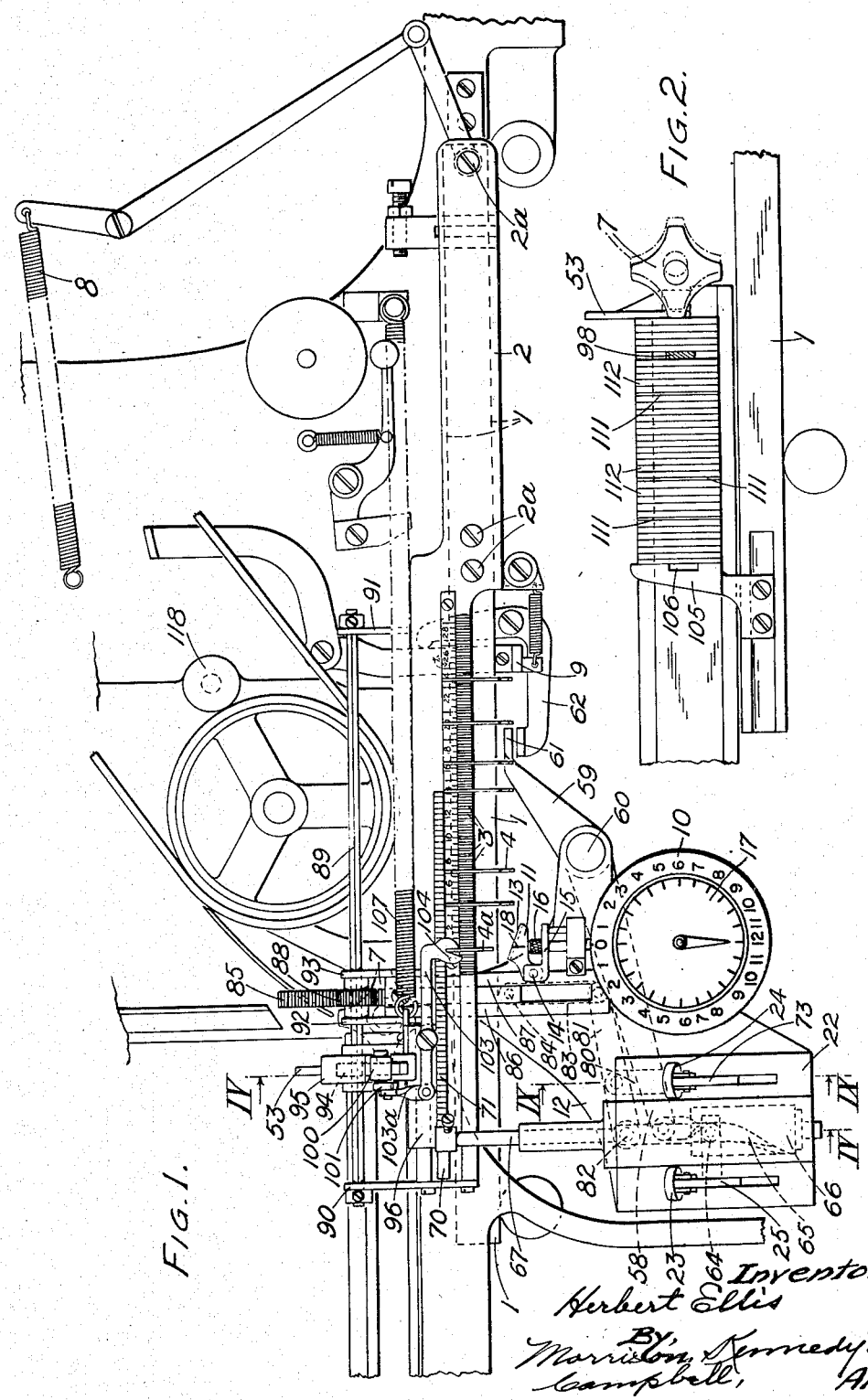

Sept. 19, 1950  H. ELLIS  2,523,102
TYPOGRAPHICAL MACHINE
Filed Aug. 18, 1943  13 Sheets-Sheet 2
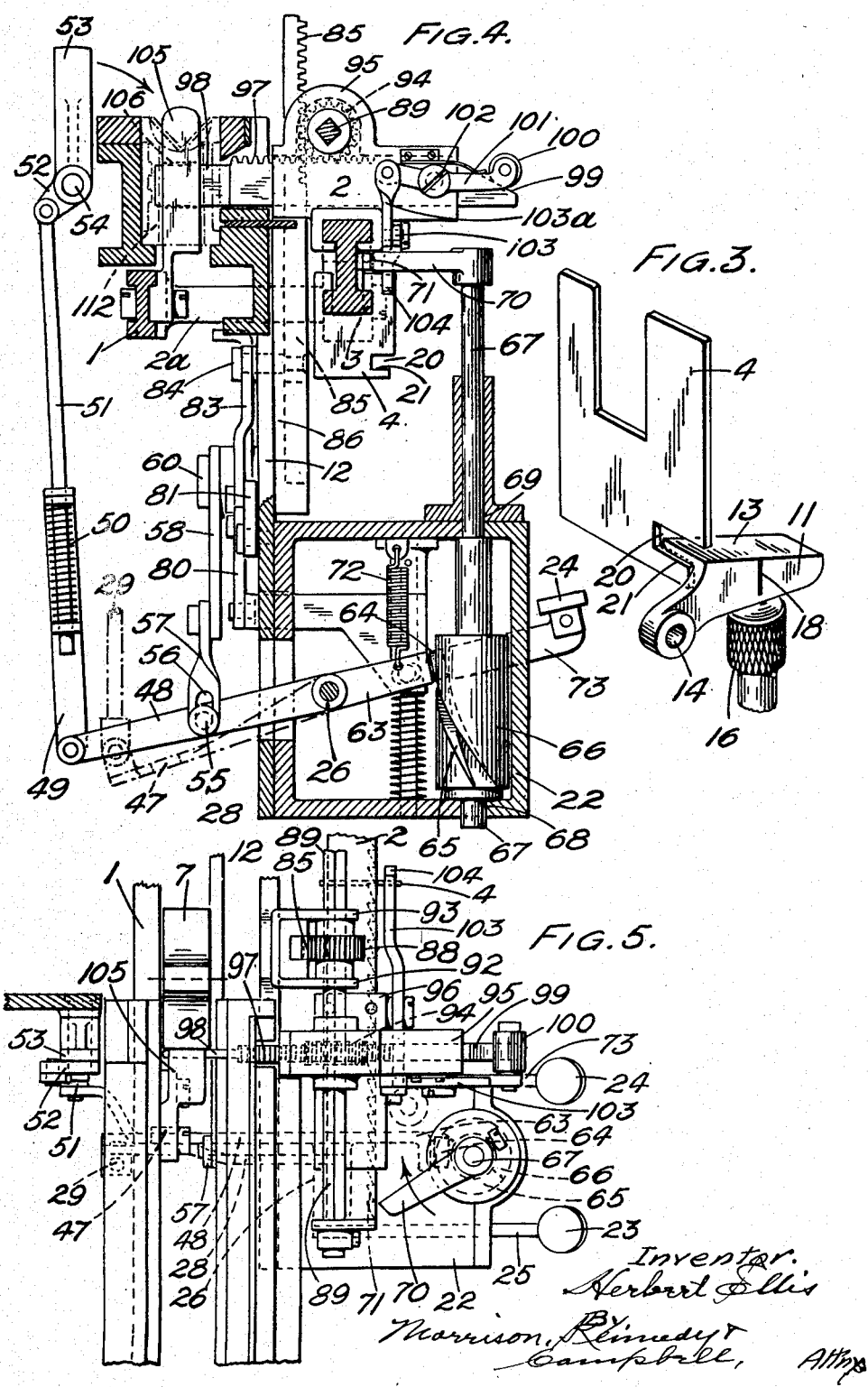

Sept. 19, 1950          H. ELLIS          2,523,102
TYPOGRAPHICAL MACHINE
Filed Aug. 18, 1943          13 Sheets-Sheet 3
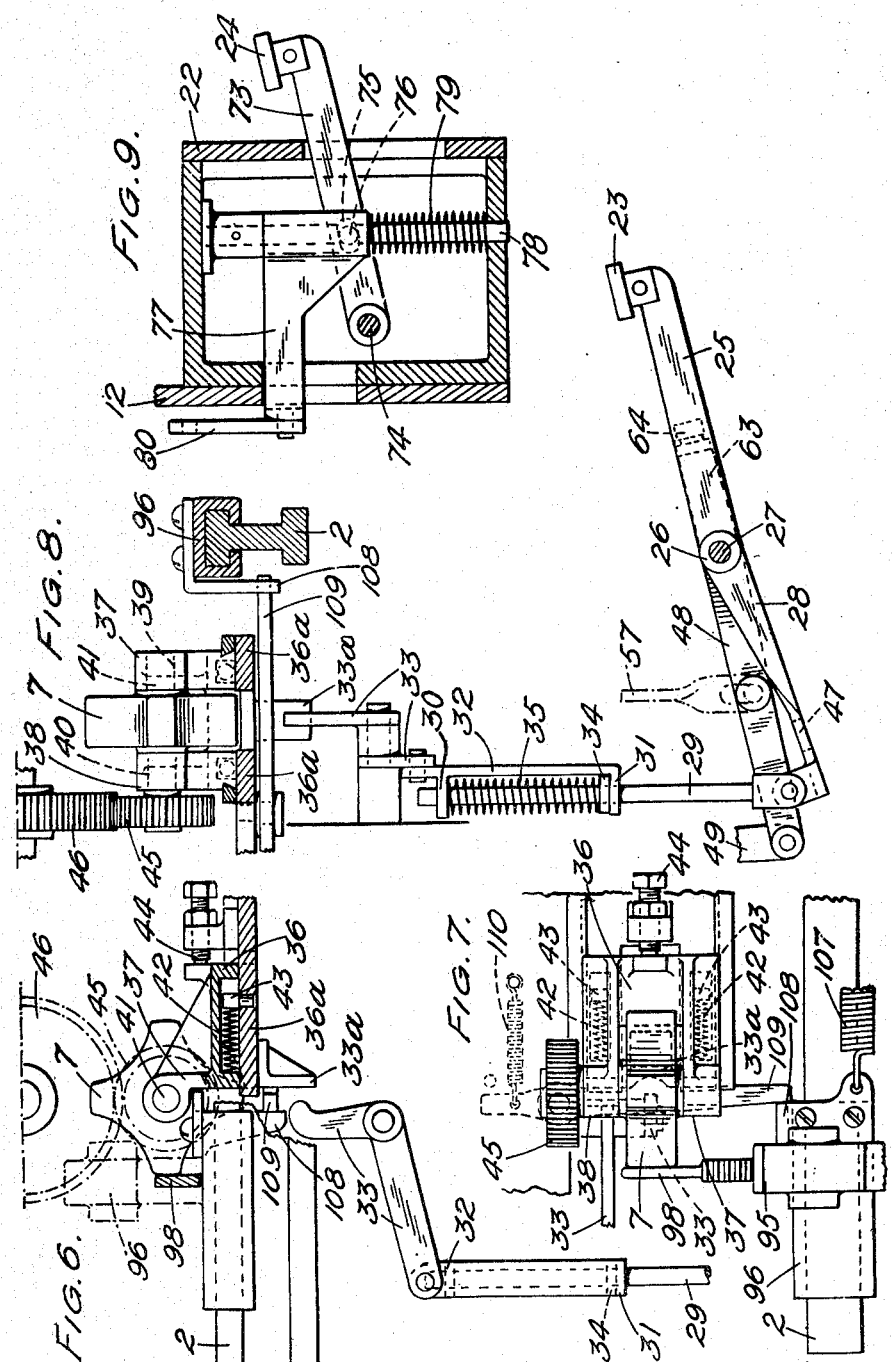

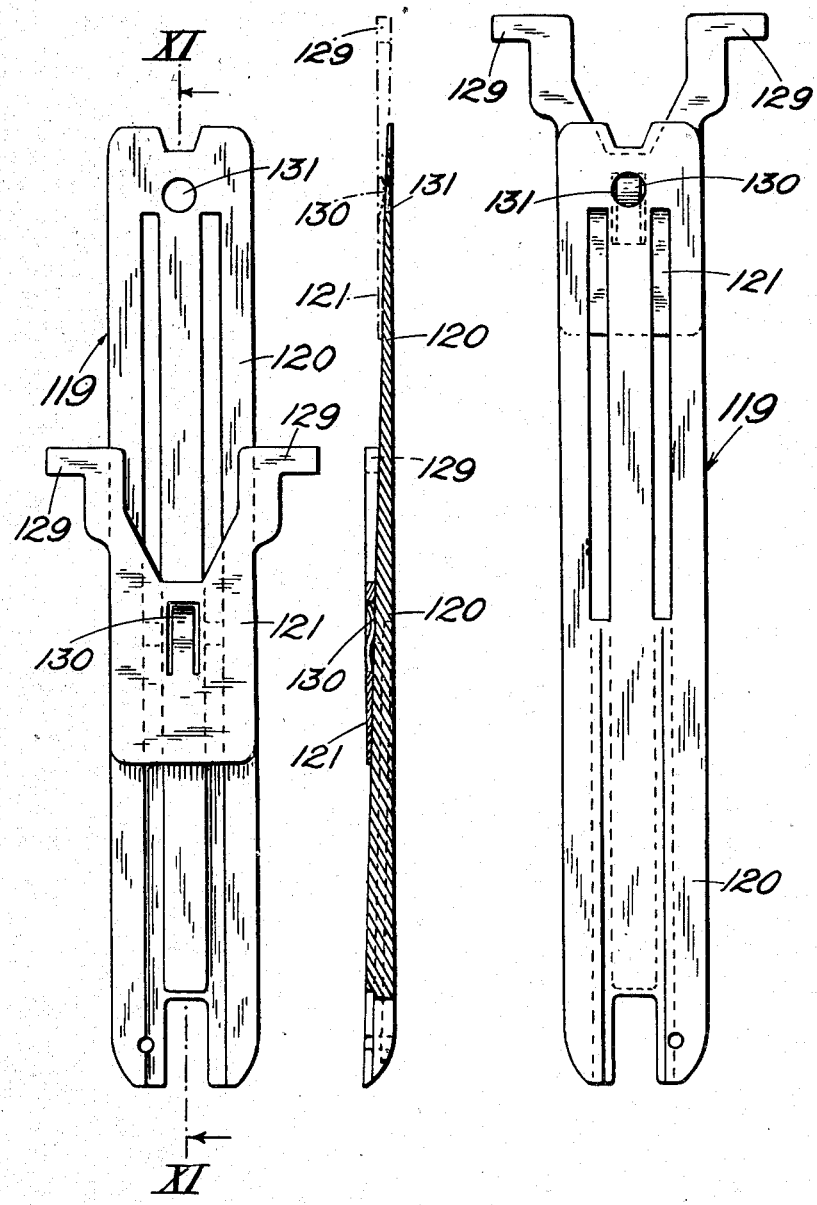

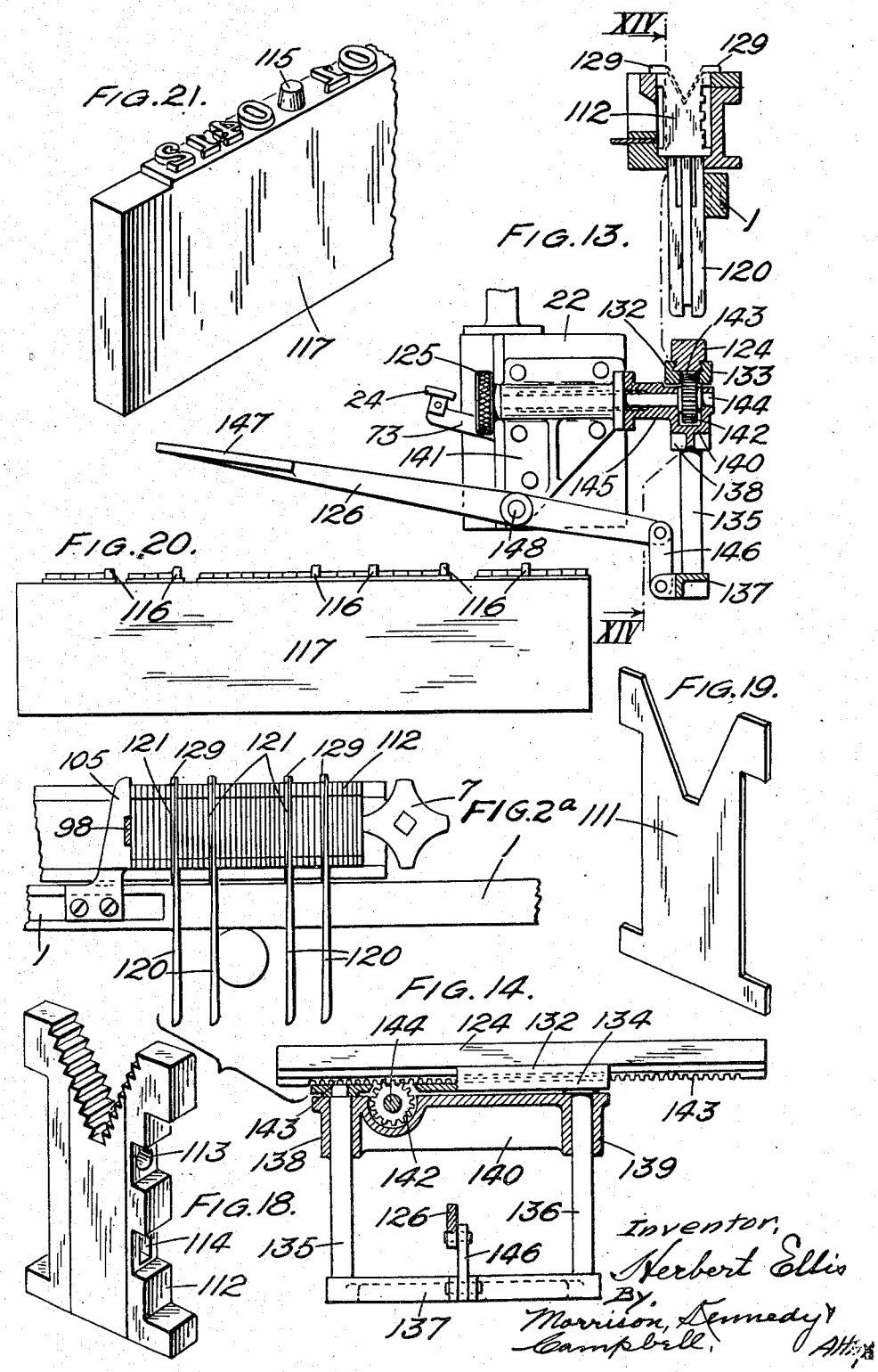

Sept. 19, 1950        H. ELLIS        2,523,102
TYPOGRAPHICAL MACHINE
Filed Aug. 18, 1943        13 Sheets-Sheet 6
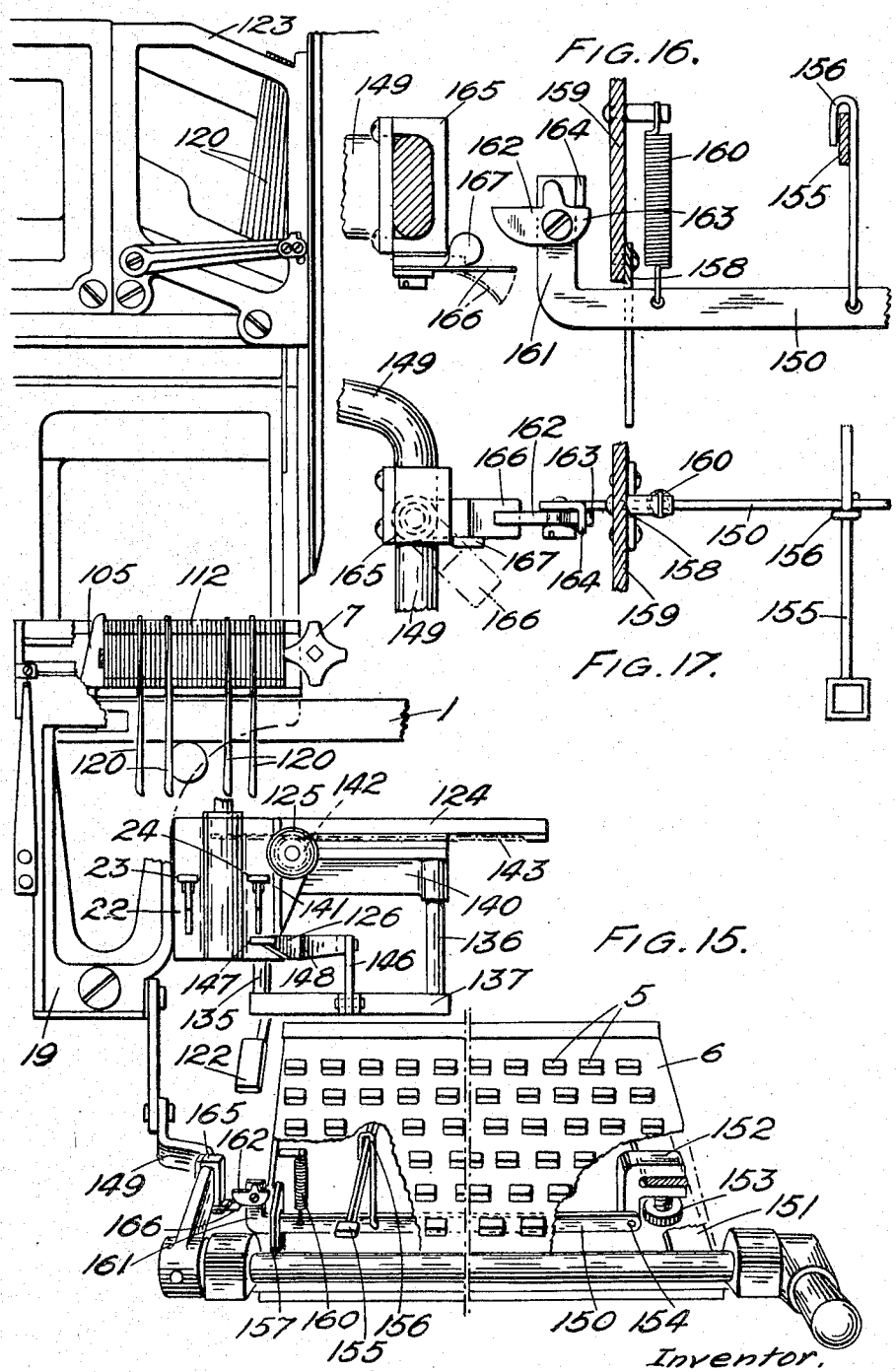

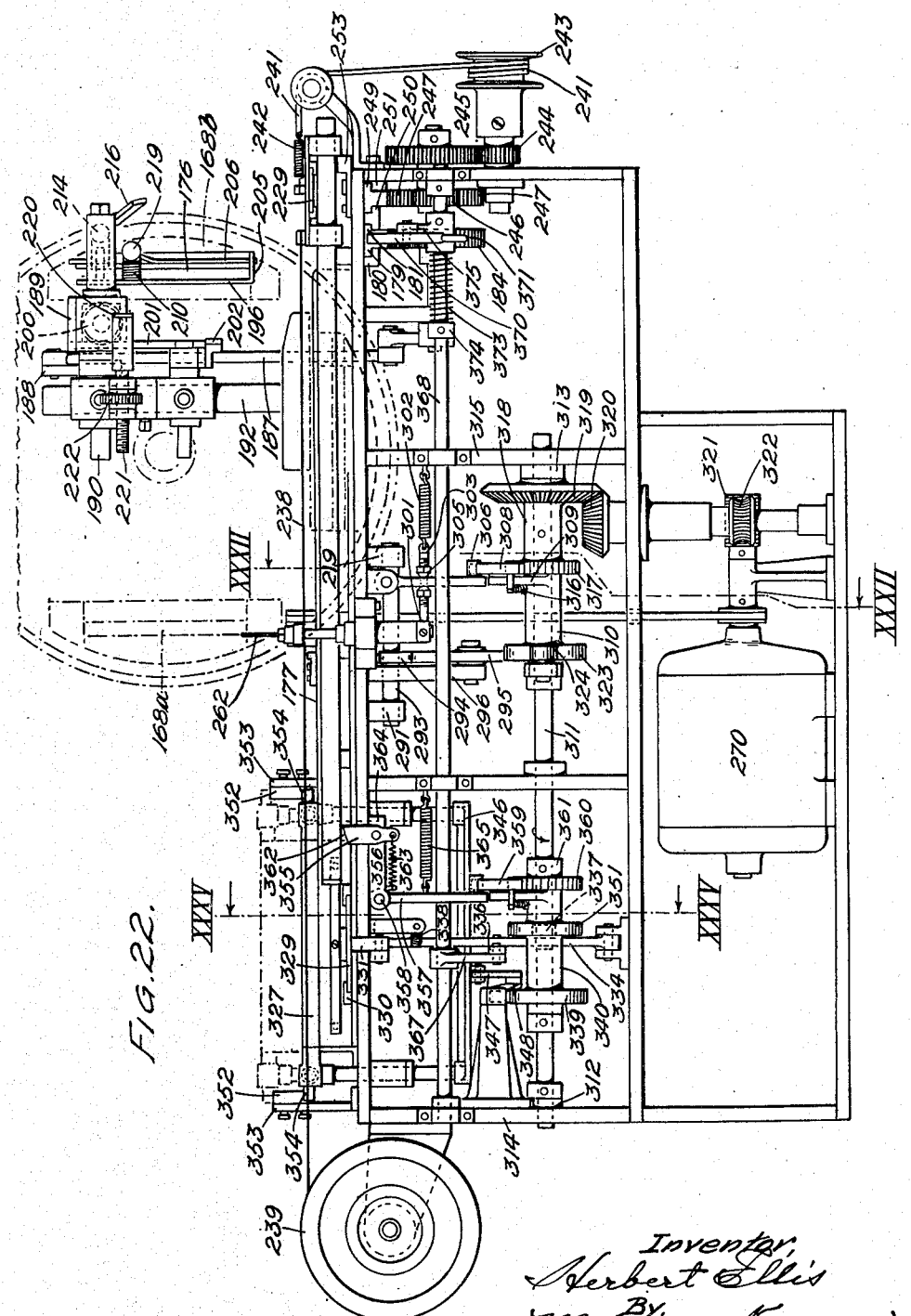

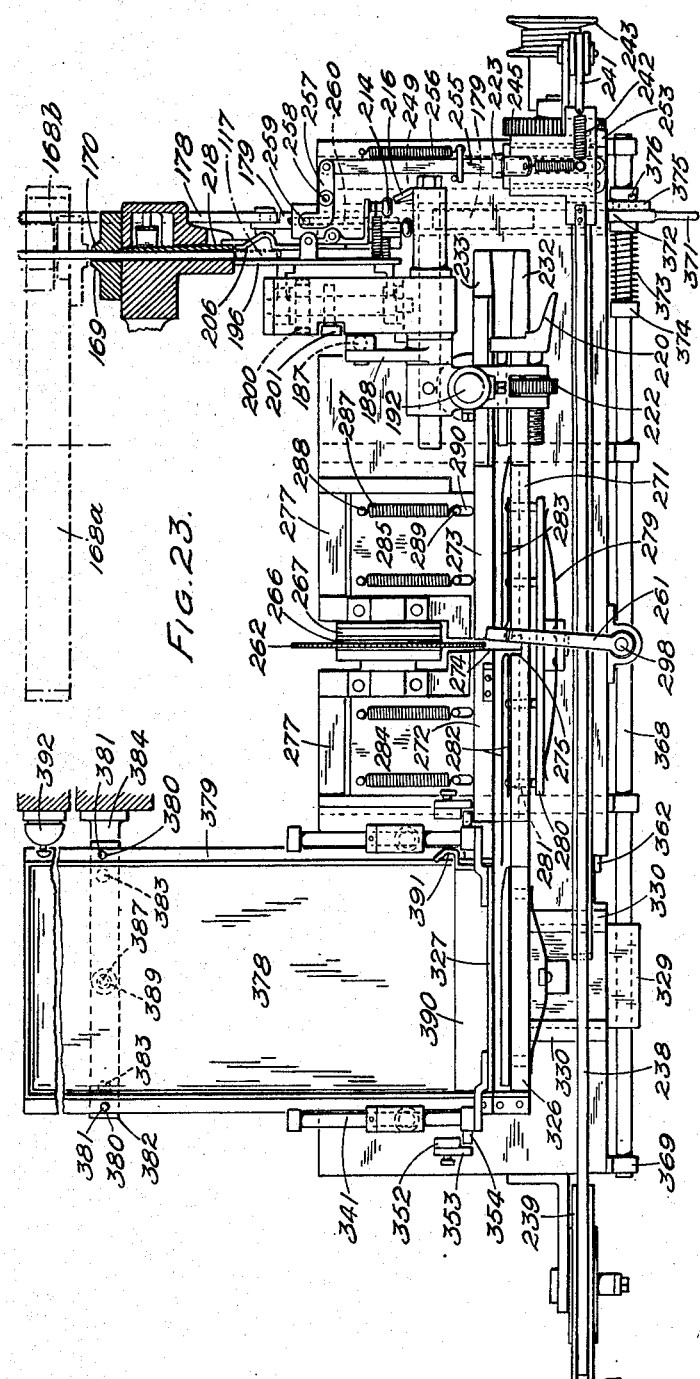

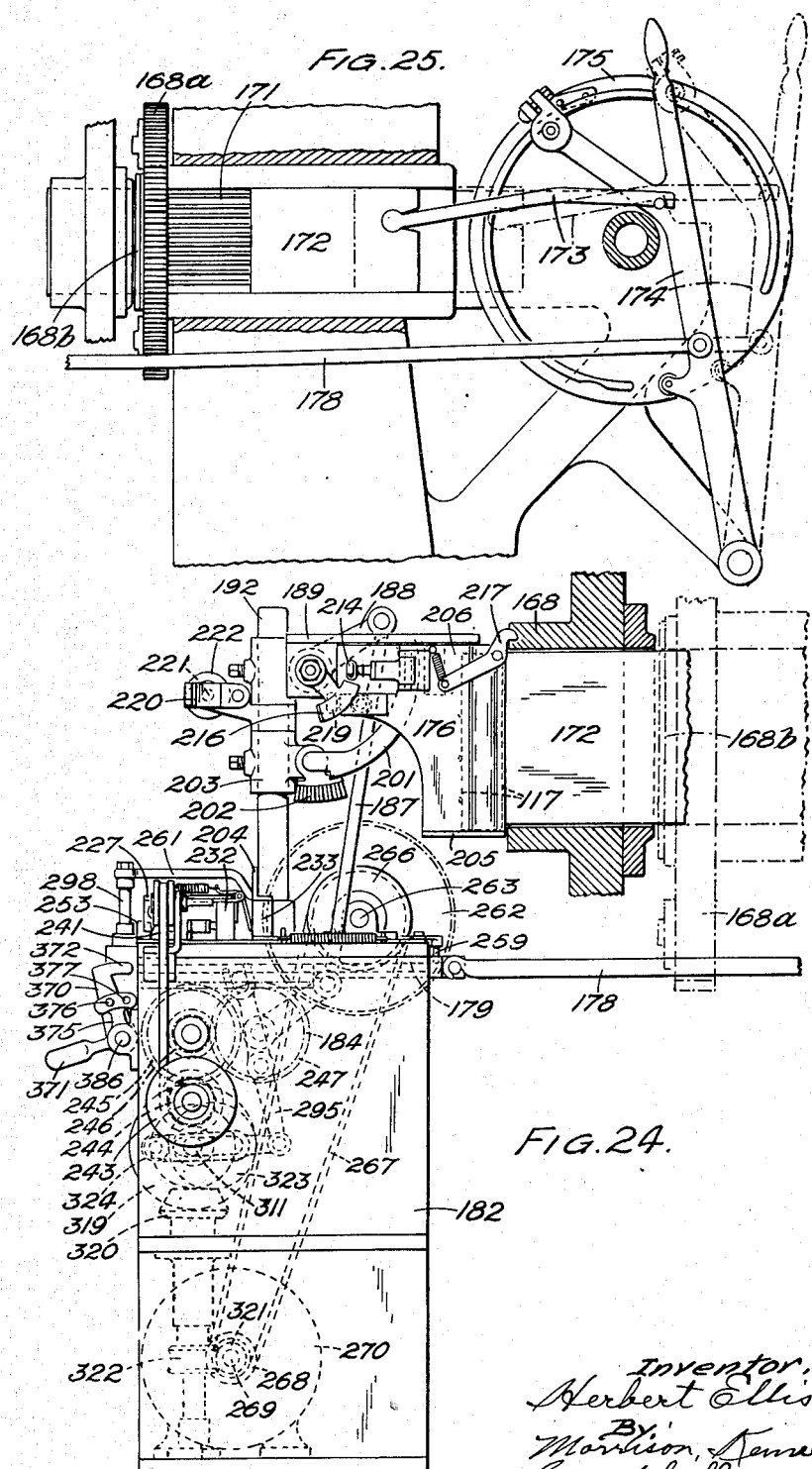

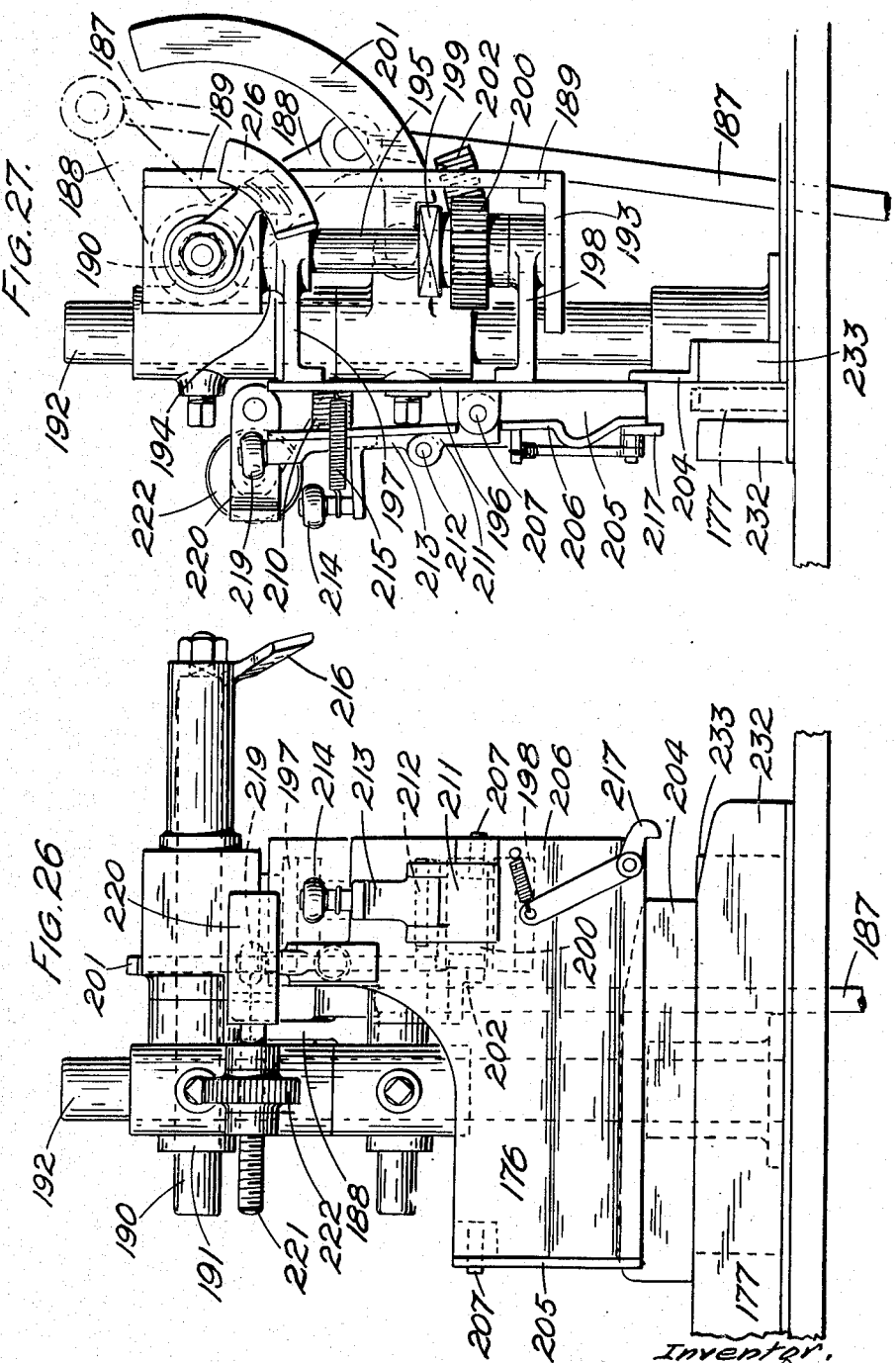

Sept. 19, 1950        H. ELLIS        2,523,102
TYPOGRAPHICAL MACHINE
Filed Aug. 18, 1943        13 Sheets-Sheet 11
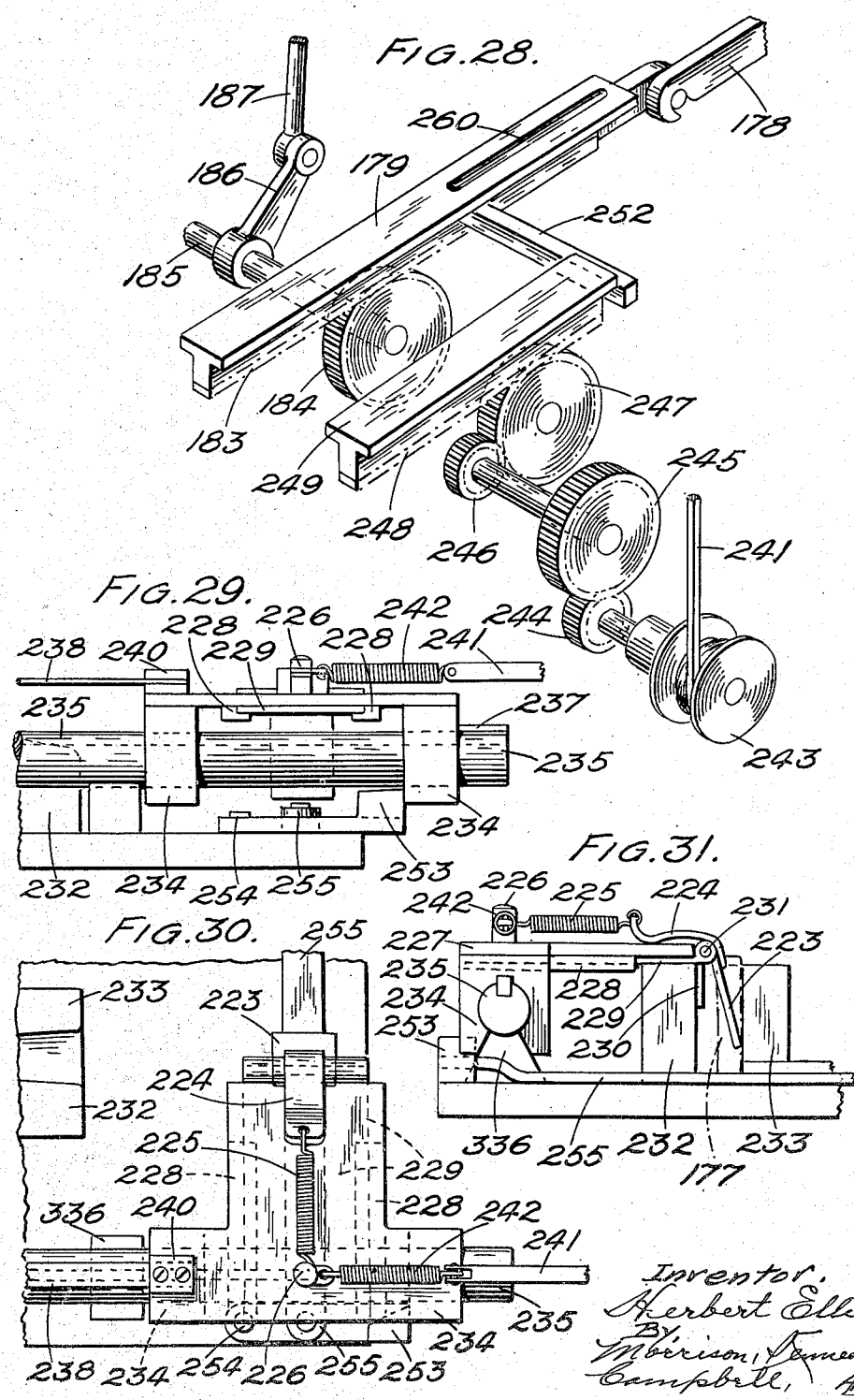

Sept. 19, 1950      H. ELLIS      2,523,102

TYPOGRAPHICAL MACHINE

Filed Aug. 18, 1943      13 Sheets-Sheet 12

Inventor,
Herbert Ellis
By Morrison, Kennedy &
Campbell, Attys

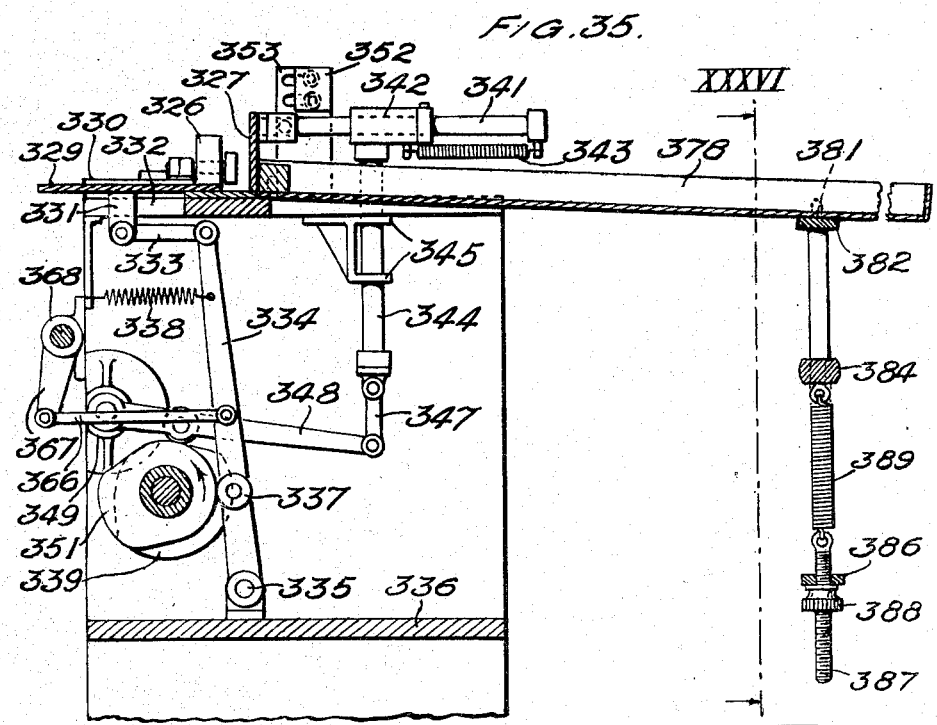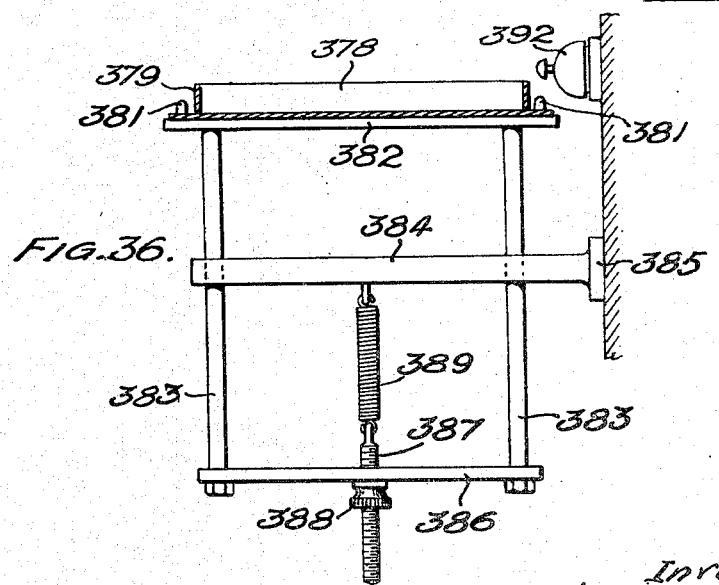

UNITED STATES PATENT OFFICE 2,523,102

TYPOGRAPHICAL MACHINE

Herbert Ellis, Shanghai, China, assignor to Linotype and Machinery Limited, London, England Application August 18, 1943, Serial No. 499,161
In Great Britain August 20, 1942

33 Claims. (Cl. 199—30)

This invention relates to typographical composing and slug casting machines such as those known commercially under the Registered Trade-Mark "Linotype." In this last-mentioned type of machine, circulating matrices are released from a magazine in the order in which their characters are to appear in print and then assembled into line, the composed line transferred to the face of a slotted mould, the mould filled with molten metal to form a slug or type bar against the matrices which produce the type characters thereon, and the matrices thereafter returned through distributing mechanism to the magazine from which they started. Such machines are hereinafter described as machines of the kind referred to. It is an object of this invention to provide means whereby tabulated matter may be more readily composed and cast and to equip such machines with an improved form of mechanism for cutting slugs after ejection from the mould, such mechanism being operable automatically to cut each slug into any desired number of sections.

According to one aspect of the invention, a composed line is set in sections, the widths of the said sections being preset and composed in succession, each section being adjusted to its correct length with the assistance of an indicating device. Preferably, the sections are preset by the use of spacing elements which are mounted on a member which may be attached to the assembler slide. The said elements are arranged to engage with the indicating device whereby the operator is enabled to perceive the amount by which the line requires to be adjusted to bring it to its correct setting, and such adjustment may be carried out by hand. Mechanism may be provided whereby the sections are justified independently and a member or members which are hereinafter again referred to may be inserted in the line between the sections to indicate the points at which the slugs cast from the separate sections should be severed if desired. As hereinafter more fully set forth, the said members may be employed to cast a special marking on the type bar which may be employed to actuate severing mechanism which is brought into operation to cut the bar.

According to another aspect of the invention, a space-band is provided, the band of which is adapted to remain in the upward position and which does not fall in relation to the slide after it has been raised. The said spacebands may be inserted in the line as desired, such as in the sections above referred to, and mechanism may be provided for justifying any or all of the said sections separately in such a manner that once justification has taken place the composed matrices and spacebands will remain in their justified position. Preferably the said spacebands are constructed with a spring engaging between the slide and the band portion thereof, which spring is adapted to engage in an aperture in one portion or the other at or about the position of maximum extension of the spaceband so as to allow freedom of movement of the parts relatively to one another for a limited distance adjacent this position. The spring, however, is so arranged as to bind the parts together upon relative movement of the said parts beyond such limited distance. The spring may be attached to or form part of the slide and the aperture is preferably formed in the upper portion of the band.

A further feature of the invention resides in the provision of a member adapted positively to deliver the cast slug from the mould. Preferably the said member is in the form of a grabber operated from a moving part of the machine which is arranged to receive and grip the slug in its vertical ejecting position, to turn about a horizontal axis to carry the slug downwardly, and thereafter to turn through an angle of 90° about a vertical axis to deliver the same on to a track or into a suitable receptacle.

The invention further contemplates the provision of a power-driven saw associated with means for conveying a slug past the saw, arresting the slug at a predetermined position in relation to the saw, moving the slug towards and away from the saw to effect the cut, and subsequently continuing the movement of the slug sections.

A slug cutting mechanism according to the invention may comprise a power-driven saw located in a fixed position in relation to a track along which each slug is conveyed by an automatically operated pusher, until the slug is arrested in the position at which the desired cut is to be made, by a trip device which also initiates the movement of the slug towards and away from the saw for effecting the cut, the actuation of the trip device being controlled primarily by the incorporation in the assembled matrix line from which the slug is cast, of a member or members hereinbefore referred to, each indicating a section of the line to be comprised in a severed portion of the slug. Any desired number of such members may be incorporated in the matrix line to provide for successive actuation of the trip to bring about a repetition of the cutting operation, the slug being thus intermittently advanced until all the desired sections are severed. The movement of the pusher is preferably continued after the whole of the slug has passed the saw, until a further trip device is operated, either by the slug or the pusher, serving to bring into operation mechanism for transferring the slug from the track to a galley, wherein successive lines cut in the desired sections are stacked in line formation against a resistant block. After the delivery of the cut slug to the galley the pusher is automatically returned to its initial position in readiness for the delivery to the track of the succeeding slug. In a modification of the mechanism last described, the saw may be arranged to be moved in relation to the slug to carry out the cutting operation and such movement may be controlled by a member or members incorporated in the matrix line in the manner hereinbefore described.

Yet another feature of the invention consists in the provision of a galley within which cast slugs are stacked, the said galley being arranged to assume an inclined position when slugs are placed therein. Advantageously, the arrangement is such that the gradient of the galley is increased in relation to the weight of slugs therein.

Referring to the drawings, which illustrate the invention in its preferred constructional form:

Figure 1 is a front elevation of the assembly mechanism of a typographical composing and slug casting machine to which the invention has been applied;

Figure 2 is a diagrammatic view of a line of matrices and spacers which have been composed according to the invention;

Fig. 2ª is a view similar to Fig. 2 but showing a line of matrices and expansible spacebands after composition.

Figure 3 is a perspective view, partly broken away, of a part of the line section measuring device;

Figure 4 is an enlarged vertical section, taken on the line IV—IV of Figure 1;

Figure 5 is a plan view of the parts shown in Figure 4;

Figure 6 is a sectional elevation of the star wheel moving mechanism;

Figure 7 is a plan of the parts shown in Figure 6;

Figure 8 is a sectional side elevation, viewed from the left, of the parts shown in Figure 6 with key lever operating mechanism;

Figure 9 is an enlarged vertical section, taken on the line IX—IX of Figure 1;

Figure 10 is a front elevation of a spaceband according to the invention, showing the spaceband in expanded position;

Figure 11 is a vertical section, taken on the line XI—XI of Figure 10;

Figure 12 is a rear elevation showing a spaceband in unexpanded position;

Figure 13 is a side elevation, partly in section, of the justifying mechanism for justifying spacebands in the assembler;

Figure 14 is a vertical section, taken on the line XIV—XIV of Figure 13;

Figure 15 is a front elevation showing the keyboard and assembler mechanism;

Figure 16 is an enlarged view, partly in section, of a part of the special matrix releasing mechanism shown in Figure 15;

Figure 17 is a plan view of the parts shown in Figure 16;

Figure 18 is a perspective view of a special matrix according to the invention;

Figure 19 is a perspective view of a spacer matrix;

Figures 20 and 21 are, respectively, a front elevation and perspective view of a slug formed with pips or projections;

Figure 22 is a front elevation of the slug receiving or grabbing mechanism and the slug cutting mechanism;

Figure 23 is a plan of the mechanism shown in Figure 22;

Figure 24 is a side elevation of the mechanism shown in Figure 22, viewed from the right.

Figure 33:
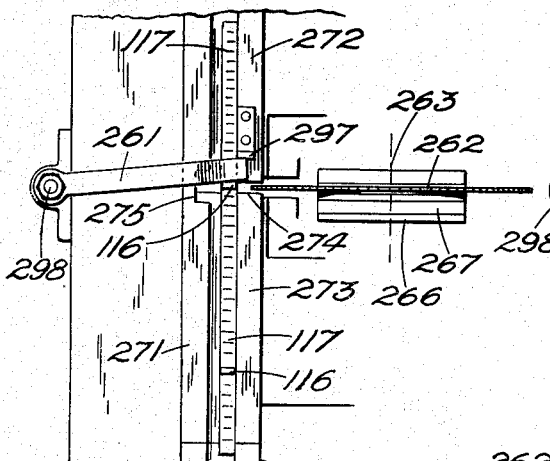
Figure 34:
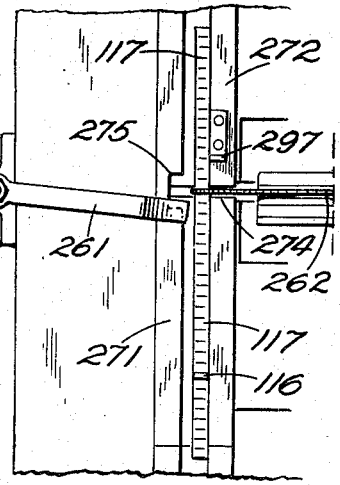
Figure 32:
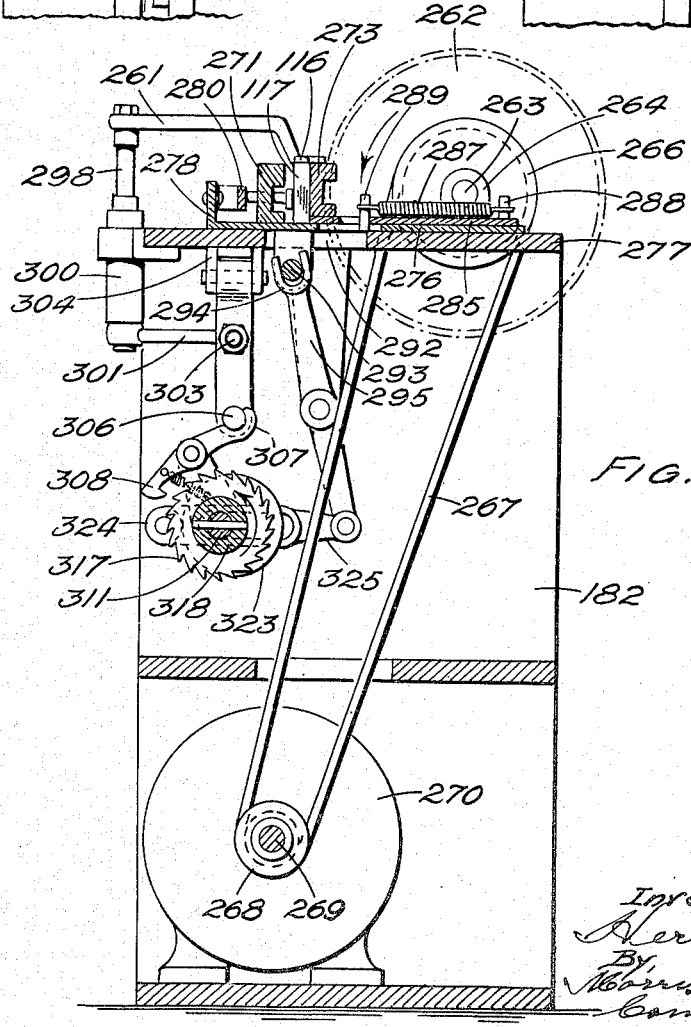

Figure 25 is a side elevation, partly in section, of the ejector operating mechanism of a typographical slug casting machine;

Figure 26 is a front elevation, on an enlarged scale, of the slug grabbing mechanism in slug releasing position;

Figure 27 is a side elevation of the mechanism shown in Figure 26, viewed from the right;

Figure 28 is a perspective view of part of the mechanism for operating the slug grabbing mechanism and slug pusher returning mechanism;

Figure 29 is a front elevation of the slug pusher mechanism;

Figure 30 is a plan of the parts shown in Figure 29;

Figure 31 is a side elevation of the parts shown in Figure 29, viewed from the right;

Figure 32 is a vertical section, taken on the line XXXII—XXXII of Figure 22;

Figure 33 is a plan of the slug cutting mechanism showing the trip arm controlling the cutting operation in tripped position;

Figure 34 is a plan similar to Figure 33, but showing the trip arm returned to normal position after slug cutting;

Figure 35 is a vertical section taken on the line XXXV—XXXV of Figure 22, showing the slug stacking mechanism and galley;

Figure 36 is a vertical section taken on the line XXXVI—XXXVI of Figure 35.

Referring to Figure 1, the assembler slide 1 has attached thereto at 2a a bar 2 provided with grooves 3 for accommodating plates 4 (see Figures 1 and 3) which are inserted so as to be tightly fitted in the grooves 3 at distances corresponding to the length of the sections of the line to be composed. As usual, the line is composed by the actuation of keys 5 (see Figure 17) on a keyboard 6 causing matrices to fall from the magazines whence they are forced into the assembler by means of a rotating star wheel 7, and are supported on the assembler slide 1 in the usual manner. In this operation, the assembler slide 1 moves to the left against the operation of a spring 8 (Figure 1) and the plates 4 are carried with it. In known machines, a brake 9 is provided, the release of which permits the spring 8 to carry the slide 1 with any matrices thereon in a return direction towards the right. In the present improvements, the composition of the sections to their correct length is ensured by means of an indicator 10 which is operated by means of a cam 11 with which the plates 4, which are moved with the assembler slide 1, are adapted to engage in succession. The said indicator 10 is mounted below the assembler on a bracket 12 attached to the machine frame and the plates 4 are arranged to engage therewith by their lower surfaces. Preferably, the first plate 4a which marks the end of the line is shorter than the remainder so as to clear the cam 11. The cam is in the form of an inclined surface 13 (Figure 3) and is pivoted at 14 to a bracket 15 attached to the indicator 10, so that engagement of a plate 4 with the inclined surface 13 causes the cam 11 to actuate the plunger 16 connected to the indicator 10, the amount of movement of the cam 11 being shown on the scale 17 of the indicator 10, which is conveniently of dial form. A mark 18 is provided on the cam 11 corresponding to a zero or other suitable mark on the indicator 10, and it will be appreciated that as the plate 4 bears on the inclined surface 13, the dial is capable of indicating an under or over setting of the line, and the amount of error which the indicator is capable of showing may be the same in either direction. A warning device, such as a bell, is arranged to be operated as the plate at the end of each section approaches the indicator, and consequently the attention of the operator is drawn to the fact that the composition of the section is approaching completion and he can then ensure, with the assistance of the indicator, that the section is set to the exact length.

To permit the plates 4 to pass the cam 11 when the assembler slide 1 and bar 2 are returned to the right after the composed line has been taken by the assembler elevator 19, each plate 4 is formed with a recess 20 (see Figure 3), the lower edge 21 of which engages with the underside of the inclined surface 13 and lifts the cam 11 about the pivot 14.

Attached to the bracket 12 is a control box 22 (Figure 1) provided with two manually operable keys 23 and 24. The key 23 actuates mechanism for clamping a line section so that a reading may be taken on the indicator 10, and the key 24 actuates mechanism for moving a member of the clamping mechanism into and out of the matrix line. The lefthand key 23 is attached to a key lever 25 (Figures 5 and 8) integral with a sleeve 26 loosely mounted on a short shaft 27 fixed to the control box 22. An arm 28 fixed to the sleeve 26 is pivotally connected to a rod 29 passing through lugs 30 and 31 of a link 32 pivotally connected to a bell-crank lever 33. The rod 29 has fastened thereon a collar 34 bearing against a compression spring 35, the other end of which bears against the lug 32 and so forms a resilient connection between the rod 29 and the bell-crank lever 33. The end of the bell-crank lever 33 is adapted to bear against a lug 33a on the carriage 36 (Figures 6 and 7) which slides on a support 36a and is provided with two upright members 37 and 38 having bearings 39 and 40 for the shaft 41 of the star wheel 7. The end of the bell-crank lever 33 moves the carriage 35 to the right against the action of a spring 42 bearing against a lug 43 on the support 36 until the carriage is arrested by an adjustable stop 44. The star wheel 7 is rotated through the engagement of pinion 45 with constantly rotating gear wheel 46 and such rotation of the star wheel is not disturbed by movement of the carriage 35.

Thus, when the key 23 is depressed, the star wheel 7 is moved to the right away from the matrix line. Further downward movement of the key 23 causes a lug 47 on the arm 28 (Figure 5) to bear against and move upwardly an arm 48 loosely mounted on the shaft 27. The arm 48 is pivotally connected to a link 49 (Figure 4) which is resiliently connected at 50 to a rod 51 pivoted to an arm 52 which is attached to an arm 53 swinging on a pivot 54. Thus, after the star wheel 7 has been moved to the right, the arm 53 is swung into the assembler adjacent the last matrix of the line and forms one member of the clamping mechanism, taking up the position previously occupied by the star wheel.

A pin 55 on the arm 48 (Figure 4) engages in a slot 56 of a link 57 which is pivotally connected to a lever 58, 59 (Figure 1) mounted on a stud 60 fixed to the bracket 12. The lever arm 59 is formed with an abutment 61 adapted to engage with the arm 62, which is depressed in known manner to release the assembler slide brake 9. Thus, still further depression of the key 23 brings the pin 55 on arm 48 into contact with the top of the slot 56, and through link 57, levers 58, 59, and abutment 61, depresses arm 62 to release the brake 9. The assembler slide 1 now moves the matrix line to the right until the last composed matrix bears against the arm 53. An extension 63 (Figure 4) of the arm 48 has attached thereto a roller 64 engaging in a cam groove 65 formed in a drum 66 mounted on a vertical shaft 67 which can turn in bearings 68, 69, on the control box 22. Fixed to the shaft 67 is a pawl 70 which can be turned into engagement with a ratchet 71 (Figure 1) formed on the bar 2. Depression of the key 23 moves the roller 64 downwardly, and through the cam groove 65 turns the drum 66 to bring the pawl 70 into engagement with ratchet 71. An additional rightward movement is so imparted to the bar 2, and hence a further clamping of the line against the arm 53 is effected. It will be understood that the shape of the cam groove 65 and the position of the pawl 70 on shaft 67 is such that a clamping pressure is not applied to the line until the assembler slide brake 9 has been released.

A spring 72 (Figure 4) attached to the extension 63 returns the key 23 and the above-described mechanisms to normal inoperative position when the key 23 is released.

The righthand key 24 (Figures 4 and 9) is attached to an arm 73 pivoted at 74 to the control box 22 and is formed with a slot 75 engaging with a pin 76 on a bracket 77 which is slidable on a rod 78 and can be moved downwardly against the action of a compression spring 79. The bracket 77 is pivoted to a link 80 pivoted to an arm 81 which is pivotally attached at 82 (Figure 1) to the control box 22. The arm 81 is connected to a link 83 which is pivotally attached to a stud 84 (Figure 4) projecting from the back of a rack 85 slidable in guideways 86 and 87 formed in the bracket 12.

The rack 85 engages with a pinion 88 (Figure 1) which is freely mounted on a square rod 89 so as to be rotatable therewith but so as to permit a longitudinal movement of the rod 89 relatively thereto. The rod 89 is attached to supports 90 and 91 fixed to the bar 2 and passes freely through side members 92 and 93 which extend from the guideways 86 and 87 and act as stops to prevent longitudinal movement of the pinion 88. A pinion 94 (Figure 4) is also freely mounted on the rod 89 and is carried in a housing 95 attached to a carriage 96 which is slidable on the bar 2, but may be secured thereto in manner hereinafter appearing. The pinion 94 engages with a rack 97 formed on a finger 98 which is slidable in the housing 95. One end of the finger 98 is formed with an inclined surface 99 with which engages a roller 100 on an arm 101 pivotally attached at 102 to the side of the housing 95 and connected through a link 103a to an arm 103 (Figure 1) pivoted to the front of the carriage 96. The arm 103 has formed thereon a hook 104 which is brought into and out of engagement with one of the plates 4 on the bar 2 according to the position of the finger 98. By this means the carriage 96, and with it the finger 98, is secured to the bar 2 and are carried to the left with the assembler slide while composition takes place. With the key 24 in its uppermost position, the finger 98 is positioned in the matrix line and the hook 104 is engaged with a plate 4. The assembler slide finger 105 (Figure 2) may be recessed at 106 to accommodate the finger 98 when the assembler slide finger 105 is in its rightmost position.

The finger 98 and carriage 96 are secured to the bar 2 and travel to the left with the assembler slide during composition of a matrix line, and when it is desired to withdraw the finger 98, the key 24 is depressed to move the rack 85 downwardly and turn pinions 88 and 94 to move rack 97 and withdraw the finger 98 from the line. Withdrawal of the finger 98 causes the inclined surface 99 to raise the roller 100 and disengage the hook 104 from a plate 4. A tension spring 107 (Figure 1) attached at one end to the carriage 96 and at the other end to the machine frame then moves the carriage 96 to its rightmost position, and release of the key 24 re-inserts the finger 98 into the line.

The carriage 96 is provided with an abutment 108 (Figure 7) which, when the carriage is in its rightmost position, engages with an arm 109 pivoted to the support 36 to move the arm 109 against the action of a spring 110. The arm 109 bears against the lug 33a on the star wheel carriage 36 and so moves or holds the star wheel 7 to the right to allow the finger 98 to be inserted in the line.

In one method of adjusting the line or a section of the line to its exact length, the key 23 is depressed to clamp the line against the arm 53. The reading on the indicator 10 is then noted and if the line section has been underset, the key 23 is released and space members 111 (Figure 19) are inserted to adjust the section to the exact length required. Included in the matrices available are a number of matrices 112 (Figure 18) formed with recesses 113, 114, which on casting produce a circular pip 115 or a rectangular projection 116 on a slug 117 above type height. The matrices 112 may be included in a magazine, in which case they are introduced into the line by keyboard operation, or they may be inserted by hand. In either case, they are placed in the line between the separate sections for a purpose hereinafter appearing.

After a section has been adjusted, the key 24 is depressed to withdraw the finger 98 from the line and carry it to the rightmost position preparatory to the composition of another line section. The arm 53 and finger 98 form two sides of a clamp between which a line section is compressed.

The operation of the parts as thus far described is broadly as follows: It being borne in mind that the primary object of the present invention is the composition of tabular matter, a section of the line to be incorporated in one spacing is first composed in the usual manner, and during this operation the finger 98 is located in its normal forward position in front of the line. The key 23 is then depressed, the star wheel 7 through the mechanism already described being first moved to the right and upon further depression of the said key the arm 53 is swung into the line adjacent the last matrix into the position previously occupied by the star wheel. Further pressure on the key 23 releases the assembler brake whereby the line section is movd to the right against the arm 53, and additional clamping pressure is applied through the pawl 70 and ratchet 71. The line section is now measured to its correct length in the manner already described by the use of the indicator 10. The key 24 is then depressed whereby through the mechanism hereinbefore set forth the finger 98 is withdrawn from the line and is carried by the carriage 96 to the right. Release of the key 24 returns the finger 98 to its normal position in the line where it is adapted to engage in recess 106 in the assembler slide finger 105 when the latter occupies its rightmost position.

While it is preferable to use both the arms 53 and finger 98 for positively clamping and measuring a line section, it will be understood that the arm 53 may be made inoperative and the key 23 depressed to clamp the line towards the star wheel 7. In addition, the key 24 may be so arranged that, on depression, the finger 98 is inserted in the line in front of the star wheel and the line clamped thereagainst instead of against the arm 53. If required, the rotation of the star wheel may be arrested by withdrawing the known disconnecting knob 118 which disconnects the drive to the star wheel. Alternatively, the finger 98 may be made inoperative and the line clamped against the arm 53 or star wheel 7. In each case, however, the line section is given a rightward clamping movement towards an abutment located in a normally fixed position.

In a modification of the above method, spacebands 119 (Figures 10 to 12) may be inserted into the line and the sections separately justified at the assembling station instead of in the casting position as heretofore. The spacebands 119 are of a special construction, and are hereinafter more fully described. Their construction is, however, such that when the band portion 120 thereof is moved upwards, a certain distance in relation to the slide 121, they will remain in the expanded position until force is exerted to release them. The spacebands 119 are preferably inserted in the line by operation of the spaceband key 122 (Figure 15) which releases them from the spaceband box 123 in the usual manner. They may, however, be inserted by hand if desired. The section is assembled as before, with reference to the indicator 10, with the spacebands therein, and the key 23 actuated for clamping the section. A small justification bar 124 (Figure 15) is normally positioned below the star wheel 7 and is adapted to be moved horizontally and vertically by means of the manually operated knob 125 and lever 126 respectively. When the section has been clamped and measured, the justification bar 124 is moved horizontally by operation of the knob 125 so as to bring it below the spacebands 119, and a vertical movement is then imparted to the justification bar 124 by depressing the lever 126 whereby the section is expanded until it appears from the indicator 10 that the same is of the desired length. Each section is dealt with in this manner and known means may be provided for rendering inoperative the mechanism commonly employed for justifying the line before casting. If desired, the whole line may be measured again after each separate section has been checked to ensure that it is of correct length. The spacebands 119 may be released by suitable means after casting, and this may be done by arranging for the upwardly protruding ends of the bands 120 to engage the known first elevator top matrix guide as the first elevator (not shown) rises after casting, carrying the matrices and spacebands with it.

Where it is desired to space some of the sections more widely apart than others, the two methods of measuring the line may be combined, those sections not requiring such spacing being measured and clamped by the method first hereinbefore described, and those which it is desired to space more widely apart may have spacebands inserted therein and be justified by the second method.

In the preferred embodiment, the spacebands 119 (Figures 10 to 12) are, as usual, formed in two parts, the band 120 and slide 121, which are of normal construction in that the slide 121 is formed with projecting lugs 129 to engage the channels in the assembler elevator 19 and first elevator 128, and the band 120 is of tapered and grooved formation adapted to engage the slide 121. A leaf spring 130 is fitted to the slide 121 and is adapted to engage the band 120 when the two parts are fitted together so that force is required to enable the parts to move relatively to one another. An aperture 131 is provided in the upper part of the face of the band 120 in which the end of the leaf spring 130 engages at or about the position of maximum extension of the spaceband (Figure 12) so as to allow freedom of movement of the band 120 for a limited distance adjacent this position. Beyond such limited distance, however, the spring 130 binds the band 120 and slide 121 together, so that the band 120 remains in the position to which it is adjusted (Figures 10 and 11) until force is applied.

The justification bar 124 (Figures 13 and 14) is slidable in guideways 132, 133, formed in a horizontal bar 134 attached to vertical members 135 and 136 which are connected by a crosspiece 137. The members 135 and 136 are vertically slidable in bearings 138 and 139 which are formed in a support or housing 140 attached to a bracket 141 fixed to the side of the control box 22. The support 140 accommodates a pinion 142 meshing with a rack 143 formed on the justification bar 124, the pinion 142 being fixed to a shaft 144 passing through a bearing 145 formed in the support 140 and through the bracket 141 to terminate in the knob 125 by means of which the pinion 142 is rotated. The crosspiece 137 is pivotally connected by means of a link 146 to one end of the lever 126 formed with a finger portion 147 and pivoted at 148 to the bracket 140. In operation, the knob 125 is turned to move the justification bar 124 to the left into a position below the spacebands 119 which require justification. The lever 126 is then moved downwardly to raise the bar 134 and justification bar 124 to the extent required to justify the line or line section to the desired length, as determined by the indicator 10. After justification, the lever 126 is released to lower the bar 134 and justification bar 124 and the knob 125 may be turned if necessary to move the justification bar 124 to the right.

When the first matrix in the next line to be set happens to be the same for a number of successive lines, as may be the case with one of the special matrices 112, the downward movement of the assembler elevator 19 may be utilised to release the said matrix. In one arrangement for carrying this into effect (see Figures 15 to 17) the downward movement of the assembler elevator lever 149 is employed for this purpose. A rod or bar 150, which is arranged to cooperate with the assembling elevator lever 149 in manner hereinafter described, is positioned underneath the keyboard 6 and the right end of the bar 150 (Figure 15) is secured to the side 151 of the keyboard by means of a bracket 152 provided with a screw 153 and secured to the bar 150 by means of a pin 154 upon which the said bar 150 swivels freely in an upward and downward direction. At the position on the bar 150 immediately below the key-board lever 155 which it is desired to operate, a vertical hook 156 (Figure 16) connected at its lower end to the bar 150 is arranged to engage loosely around the keyboard lever 155. Thus, when the bar 150 is pushed down, the hook 156 pulls the keyboard lever 155 down, so releasing a matrix.

The bar 150 is free to work vertically to a limited extent which is determined by means of a slot 157 in a bracket 158 attached to the left side 159 of the keyboard. The bar 150 is normally held in its top position by a spring 160 and the hook 156 then bears loosely on the keyboard lever 155, but without pressing on it. After passing through the slot 157, the bar 150 is bent upwards to form an upright bar 161 which carries a pawl 162 having a portion 163 bearing against a stop 164 formed on the bar 161.

Clamped on the assembler elevator lever 149 and directly opposite the pawl 162 is a small bracket 165 which carries a piece of thin spring steel 166 formed with a finger portion 167 which can be swivelled by the fingers so that when the spring 166 is horizontally at right angles to the assembler elevator lever 149 and pointing towards the pawl 162, the tip of the spring 166 will engage the point of the pawl 162. With the spring 166 in this position the mechanism is in operative position and when the assembler elevator lever 149 is lifted to send away a line, the tip of the spring 166 will lift the pawl 162 and freely pass it. On the downward movement of the assembler elevator lever 149, the tip of the spring 166 contacts the pawl 162 which, not being free to descend owing to the portion 163 bearing against the stop 164, causes the bar 150 to be pressed down to its lowest position so that the hook 156 attached to it pulls down the keyboard lever 155 and so releases a matrix. Upon the bar 150 reaching the lowest limit of its movement, the resistance causes the spring 166 to bend and flick past the point of the pawl 162, thus releasing the bar 150 which again rises to its normal upper position.

When this mechanism is not being used, the spring 166 is turned aside to the dotted line position shown in Figure 17, by means of the finger portion 167, so as to clear the pawl 162 when the assembler elevator lever 149 is moved up and down.

As already mentioned, the assembler line has incorporated therein, as an indication of the position at which each section is to be severed from the cast slug 117, a special matrix 112 having recesses 113, 114, for producing on the face of the slug a projection 115 or 116 extending above type height. The slug, after casting, is received by a grabber which takes the slug to a horizontal track and releases it in front of a pusher. The pusher moves the slug along the track until a projection bears against a trip arm controlling mechanism for effecting the cutting of the slug which is subsequently stacked in a galley.

The slug is cast in a mould in the usual manner. The moulds (Figures 22 and 25), usually four in number, are mounted on a mould disc 168a and the slug is cast when the mould, 168b, is in a horizontal position, the mould disc being then rotated until the mould is in a vertical position, in which position the slug is ejected (see Figures 24 and 25) in known manner. The slug 117 is ejected through a knife block 168 (Figures 23 to 25) provided with knives 169 and 170 for trimming the sides of the slug, by means of adjustable ejector blades 171 connected through slide 172 and link 173 to the ejector lever 174 controlled by cam 175.

A grabber 176 (Figures 22, 24 and 26) receives the slug 117 in the ejecting position shown in Figures 24 and 25 and carries it to the position shown in Figure 26, in which the grabber 176 releases the slug to enable it to be pushed along the track 177. For imparting such movement to the grabber a link 178 (Figure 25) is connected at one end to the ejector lever 174 and at the other end to a rack bar 179 (Figure 28) sliding in guideways 180, 181 (Figure 22) attached to the frame 182. The rack bar 179 is formed with a rack 183 engaging with a pinion 184 attached to a shaft 185 mounted in the frame 182. The shaft 185 has fixed thereto an arm 186 connected to a rod 187 which at its upper end is connected to an arm 188 fixed to a bracket 189 freely mounted on a fixed horizontal shaft 190 carried by a collar 191 which is supported by a vertical post 192 (Figures 26 and 27). The bracket 189 is provided with bearing 193, 194, in which a shaft 195 is freely mounted. One side plate 196 of the grabber 176 has extending therefrom arms 197, 198, which are fixed to the shaft 195. Also attached to the shaft 195 are a fixed nut 199 and a pinion 200, the former bearing against a track or guide 201 and the latter adapted to engage with a rack 202 which is of slightly curved formation (see Figures 24 and 27). The track 201 and rack 202 are mounted on a bracket or collar 203 clamped to the vertical post 192.

In operation, the forward movement of the ejector slide 172 brings the slug grabber 176 to the position shown in Figure 24 for receiving the slug. Backward movement of the ejector slide 172, and hence backward movement of the link 178 and rack bar 179, turns the pinion 184 in a clockwise direction (viewed from the right in Figure 28) so that the arm 186 and rod 187 are moved downwardly to swing the arm 188 downwardly and move the bracket 192 and shaft 195 downwardly to swing the grabber 176 down and away from the knife block 168. While swinging downwardly the grabber 176 remains substantially in line with the knife block 168, the nut 199 and track 201 acting as a guide in such movement.

As the shaft 195 moves downwardly, the pinion 200 comes into engagement with the rack 202 and the nut 199 reaches the lower end of the track 201 so that the shaft 195 and the grabber 176 attached thereto is turned through an angle of 90° to the position shown in Figure 26 for releasing a slug into the track 177. The grabber 176 is guided in this position by a plate 204 attached to the track 177 and bearing against the side plate 196 of the grabber.

Similarly, the forward movement of the ejector slide 172, link 178 and rack bar 179, turns the pinion 184 in an anti-clockwise direction and moves the rod 187 upwardly, so carrying the bracket 192 and shaft 195 upwardly. The pinion 200 is turned during this movement until it goes out of engagement with the rack 202 and the nut 199 bears on the track 201. The grabber 176 is thus turned from the position shown in Figure 26 and swung upwardly to the slug receiving position shown in Figure 24.

The grabber 176 as shown in Figures 24, 26 and 27, is formed with two side plates 196 and 206 and an end piece 205. The side plate 196 is fixed and the side plate 206 is movable being pivoted at 207 to the end piece 205 and at 208 to a lug 209 extending from the side plate 196 (Figure 27). When the grabber is in the slug receiving position, as shown in Figure 24, the end piece 205 forms a shelf upon which the slug can rest. A compression spring 210 tends to bring the lower ends of the side plates 196 and 206 together to keep the grabber normally closed. A bracket 211 fixed to the side plate 206 supports a rod 212 on which is freely mounted an arm 213 (Figures 26 and 27), terminating in a knob 214. The arm 213 is connected to the side plate 196 by means of the spring 215. Inward movement of the arm 213 and knob 214 causes the arm 213 to bear against the side plate 206 to open the grabber. Owing to the mounting of the arm 213, outward movement of the arm 213 against the action of a spring 215 merely moves the arm 213 away from the grabber.

Movement of the grabber 176 upwardly to the slug receiving position shown in Figure 24 brings the knob 214 into engagement with the inner surface of an inclined cam 216 fixed to the horizontal shaft 190 (see also Figure 26), so that the grabber is opened. The knob 214 passes out of engagement with the cam 216 (Figure 24) and the grabber tends to close. A spring catch 217 on the movable plate 206, however, is arranged to come into engagement either with a surface on the knife block 168 (Figure 24) or with the spring plate 218 (Figure 23) usually provided in the knife block. As a slug is ejected, it rests on the end piece 205 of the grabber and downward swinging movement of the grabber away from the knife block 168 allows the grabber plates 196, 206, to close on to the slug. As the grabber swings downwardly the knob 214 passes along the outside surface of the cam 216 so that the side plate 206 is not moved. When the grabber moves into the position shown in Figure 26, a knob 219 formed on a fixed extension of the movable plate 206 contacts with the inner surface of a fixed cam 220 and the grabber is opened to release the slug. The cam 220 is attached to a screw-threaded rod 221 passing through lugs formed on the collar 191 but having a knurled adjusting nut 222 by means of which the position of the cam 220 is varied.

When released into the track 177, a slug is in front of a pusher 223 (Figure 31) which is adapted to push the slug along the track 177 so that the slug may be cut in sections and finally stacked. The pusher 223 has an arm 224 attached by a spring 225 to a post 226 formed on a plate 227. The plate 227 has guideways 228 in which can slide a plate 229 having a downwardly extending portion 230, the pusher 223 and arm 224 being pivoted at 231 thereto. When the pusher 223 is moved into the track 177, the downwardly extending portion 230 of the plate 229 is adjacent one side wall 232 of the track 177, the tip of the pusher 223 bearing lightly against the opposite wall 233 of the track. For a purpose to be hereinafter described, a section of the track is formed with transversely movable walls and the pusher, by reason of the construction described, is able to move transversely therewith.

The plate 227 is attached to a carriage in the form of two end pieces 234 which are adapted to slide parallel to the track 177 along a rod 235 and a guiding support 236 which is also located parallel to the track 177. A stop 237 on the rod 235 limits the sliding movement of the carriage. The carriage 234 is moved in one direction, in which the pusher 223 moves the slug along for cutting and stacking, by a tape spring 238 which is wound on a reel 239 (Figure 22) and attached at the other end, as at 240, to the plate 227.

The carriage and pusher are returned by a chain 241 connected to a spring 242 fastened at one end to the post 226 (Figure 29), the chain being wound around a driven reel 243 (Figure 22). The reel 243 is rotated through the gear train 244, 245, 246, 247, by a reciprocating rack 248 (Figure 28) carried by a rack bar 249 sliding in guideways 250, 251 (Figure 22) in the frame 182. A projection 252 (Figure 28) on the rack bar 179 engages with the end of rack bar 249 so that the same is moved forwardly together with rack bar 179. Thus, as the grabber 176 is swung upwardly to the slug receiving position shown in Figure 24, the carriage 234 and pusher 223 are returned to the rightmost position shown in Figure 22. The backward movement of rack bar 179 to swing the grabber 176 downwardly carries the projection 252 away from the rack bar 249, but when the carriage 234 is released from the position shown in Figure 22 to push a slug along the track 177, the tape spring 238 moves the carriage 234 to the left and unwinds the chain 241. The reel 243 is thereby turned, and through the gear train 244, 245, 246, 247 and rack 248, the rack bar 249 is gradually moved backwardly to a position in which it can be engaged by projection 252. The carriage 234 is held in the position shown in Figure 22 by a latch 253 (Figure 29) pivoted at 254 to the top of the frame 182. The latch 253 is connected to a link 255 (Figure 23) which is adapted to slide forwardly against the action of a spring 256 to move the latch 253 away from the carriage 233. The link 255 is connected to an arm 257 pivoted at 258 to the frame 182 and provided with a downwardly extending pin 259 which engages in a groove 260 formed in the rack bar 179. As the rack bar 179 completes its backward movement to swing the grabber 176 to the position shown in Figure 26, the end of the groove 260 comes into contact with the pin 259, so moving the arm 257, link 255, latch 253, to release the carriage 234. When the rack bar 179 moves forwardly to carry the end of the groove 260 away from the pin 259, the latch 253 is moved backwardly by spring 256 to the carriage engaging position. When the carriage 234 is moved to the right it presses back the latch and is finally held thereby in the position shown in Figure 29.

The pusher 223 moves a slug 117 along the track 177 until a projection 115 or 116 thereon engages a trip arm 261 (Figure 32) which becomes operative to cause the slug to be moved against a rotating saw 262 for cutting the slug into sections. The saw is mounted on a shaft 263 carried in bearings 264 and supports 265 attached to the top surface of the frame 182. A pulley 266 on the shaft 263 is driven by a belt 267 from a pulley 268 on the shaft 269 of an electric motor 270 fixed to the bottom of the frame 182 (see also Figure 22).

The track 177 (Figure 23) is provided with fixed wall sections 232, 233, a movable front wall section 271, and movable rear wall sections 272, 273. The edge of the saw 262 is normally located in a gap 274 between the wall sections 272, 273, and a groove 275 is provided in the front wall section 271 to accommodate the edge of the saw when the wall sections have pressed a slug thereagainst.

Referring to Figures 22, 23 and 32, the movable front wall 271 is fixed to a plate 276 which can slide in guideways arranged fore-and-aft of the plate 277 of the frame 182. The plate 276 is provided with an extension 278 to which is attached a spring plate 279 bearing on a rail 280. Attached to the rail 280 are plungers 281 passing through the wall 271 to support spring rails 282, 283, which press resiliently on the side of the slug. The rear walls 272, 273, are fixed to plates 284, 285, sliding in guideways 286 on the frame plate 277. Tension springs 287 extend between posts 288 fixed to the plates 284, 285, and posts 289 which are fixed to the frame plate 277 and pass through slots 290 in the plates 276, 284 and 285. The plate 276 is provided with downward extensions 291 passing through slots 292 in the frame plate 277, the extensions 291 being attached to a rod 293 engaging in a fork 294 formed at the end of an arm 295 pivoted on a support 296 extending from the frame 182. Movement of the arm 295 towards the saw 262 by mechanism, hereinafter more fully described, under the control of the trip arm 261, causes the front wall 271 and spring rails 282, 283, to press a slug against the rear walls 272, 273, which are thus pressed rearwardly against the action of springs 287 and allow the slug to be pushed against the saw. Movement of the arm 295 away from the saw, after cutting through the slug, restores the walls to normal position.

The trip arm 261 is pushed against a stop 297 on the rear wall 272 (Figure 33) by a projection such as 116 on the slug, and such movement of the trip arm causes the slug to be pressed against the saw for cutting. The slug 117 and the projection 116 are transversely cut through by the saw and the trip arm then returns to the position shown in Fig. 34.

The trip arm 261 is attached to a vertical rod 298 which is supported by a collar 299 in a bearing 300 carried by the plate 277 (Figure 32). The lower end of rod 298 is connected to a screw-threaded rod 301, the end of which is attached to a spring 302 (see Figure 22) fixed at one end to a part of frame 182. The rod 301 passes freely through an arm 303 pivoted to an extension 304 of the plate 277 and is provided with adjustable nuts 305 bearing on either side of the arm 303. A stud 306 on the lower end of arm 303 engages in a fork 307 (Figure 32) formed in one end of a pawl 308. The pawl 308 is carried by a projection 309 attached to a sleeve 310 (Figure 22) which is freely mounted on a shaft 311 carried by bearings 312, and 313, fixed respectively to the end support 314 and intermediate support 315 of the frame 182.

A spring 316 (Figure 22) connected between the pawl 308 and the sleeve 310 tends to pull the pawl into engagement with a ratchet 317, but such movement is prevented by the engagement of stud 306 in fork 307. The ratchet 317 is formed on a sleeve 318 fixed to the shaft 311 which is continuously driven through gearing 319, 320, 321 and 322 by the motor 270. The freely mounted sleeve 310 has attached thereto a cam 323 with which engages a cam roller 324 on an arm 325 connected to the before-mentioned arm 295. The shape of the cam 323 is such that during one revolution thereof, the arm 295 and hence the walls 271, 272 and 273, are moved towards and away from the saw 262 for a cutting operation.

Referring to Figures 22 and 23, when the trip arm 261 is moved to the left, the stud 306 is withdrawn from the fork 307, and pawl 308 is allowed to engage with ratchet 317 so that the sleeve 310 and cam 323 are rotated. After cutting through a slug, the trip arm 261 is returned to the position shown in Figure 34 by the spring 302 and the stud 306 is now positioned so that the fork 307 will come into engagement therewith and the pawl 308 will be disconnected from ratchet 317.

After a slug has been cut into sections by the above-described mechanism, it is moved by the pusher 223 along to the end of the track 177 where the slug is stacked on a galley located at right angles to the track and extending rearwardly thereof (Figure 23). For this purpose the track is provided with a transversely movable front wall section 326 (Figures 23 and 35) and a movable stacker plate 327. The wall 326 is provided with a spring rail 328 similar to the spring rails 282, 283, and is attached to a plate 329 sliding in guideways 330 on the frame plate 277. The plate 329 is provided with a downward extension 331 passing through a slot 332 in the frame plate 277 and connected by a link 333 to a cam lever 334 pivoted at 335 to a wall 336 of the frame 182. The lever 334 has a roller 337 which is held by a spring 338 in contact with the surface of a cam 339 attached to a sleeve 340 freely mounted on the shaft 311. The shape of the cam 339 is such that one revolution thereof effects a movement of the front wall 326 towards and away from the stacker plate 327.

The stacker plate 327 is attached to horizontally sliding rods 341 carried by guide blocks 342, there being springs 343 connected between the guide blocks 342 and the ends of rods 341 tending to hold the stacker plate in a forward position. The guide blocks 342 are mounted on vertical rods 344 which pass through the frame plate 277 and slide in brackets 345 fixed to the underside of the frame plate 277. The rods 344 are connected by a crosspiece 346 having a link 347 connected to a cam lever 348 which is pivoted to a bracket 349 fixed to the frame end plate 314. The lever 348 is provided with a roller 350 bearing on the surface of a cam 351 which is fixed to the freely mounted sleeve 340. The shape of the cam 351 is such that one revolution thereof effects an up-and-down movement of the stacker plate 327 to allow a slug to be pushed on to the galley. The stacker plate may be held up out of operation by raising it and sliding plates 352 along fixed supports 353 to engage beneath projections 354 extending from the rods 341 or edge of the stacker plate.

The rotation of the sleeve 340 and hence the cams 339, 351, is controlled by a trip 355 (Figure 22) pivoted to a plate 356 which has a downwardly extending arm 357 and can swing about a rod 358 fixed to the underside of the plate 277. The arm 357 controls the engagement and disengagement of a pawl 359 on the sleeve 340 with a ratchet 360 on a sleeve 361 fixed to the shaft 311, the operation of these parts being similar to the previously described operation of the pawl and ratchet mechanism 308, 317.

The trip 355 is formed with an inclined surface 362 and is positioned so as to be engaged by the pusher carriage 234 when it travels towards the end of the track 177. When the carriage 234 travels towards the left, it turns the trip 355 against the action of a spring 363 and after the carriage has passed further to the left, the trip 355 moves back to its upright position against a stop 364. As the carriage moves to the right, it engages with the inclined surface 362 of the trip 355 and moves the plate 356 downwardly. The arm 357 is thus swung to the left against the action of a spring 365, and the pawl and ratchet mechanism 359, 360, becomes operative to rotate the sleeve 340, and cams 339, 351.

When the saw 262 is not required and the motor 270 is not in operation, the stacker plate 327 is held up by plates 352 and the wall 326 is moved to push the slugs on to the galley by mechanism operated through the forward and backward movement of the ejector slide.

Referring to Figure 35, the cam lever 334 is connected by a link 366, to an arm 367 fastened to a rod 368 supported in brackets 369 along the front of the frame 182 (see also Figure 23). An arm 370 is loosely mounted on the rod 368 and is provided with a handle 371 and a nose portion 372. The arm 370 is pressed by a spring 373 extending between a collar 374 on the rod and the arm 370, against an arm 375 (Figure 24) fixed to the rod 368. The arm 375 is provided with two holes 376 and a peg 377 which may be inserted in either hole to engage in a hole formed in the arm 370. In the position shown in Figure 24 the arm 370 is out of operation. If the peg is removed and the handle 371 lifted and the peg inserted in the second hole, the nose 372 of the arm 377 is in position between the guideways 180, 181. When the ejector lever 174 (Figure 25) moves the link 178 and rack bar 179 forwardly, the end of the rack bar 179 abuts, during the latter part of its stroke, against the nose 372 and so turns the rod 368 to move the cam lever 334 by means of which the wall 326 pushes slugs on to the galley.

The galley 378 is arranged so that the inclination thereof is increased in proportion to the weight of the slugs carried by it, and for this purpose the galley is pivotally supported at its slug receiving end and resiliently supported near its opposite end. The galley 378 has flanged side walls 379 (Figures 35 and 36) and is formed with holes or slots 380 engaging with studs 381 fixed to the frame plate 277, and a resiliently supported bracket 382 so that a full galley may readily be removed and replaced by an empty galley. The bracket 382 has downwardly extending rods 383 passing freely through holes formed in a shaft 384 which is carried by a bearing 385 attached to the side of the machine frame. The rods 383 are connected by a crosspiece 386 through which passes a screw-threaded rod 387 having a nut 388 bearing on the crosspiece 386. A tension spring 389 is connected between the rod 387 and shaft 384 so that the bracket 382 and galley 378 are resiliently supported. The galley 378 is provided with a resistant block 390 (Figure 23) which slides along the galley as the slugs are pushed thereagainst. When the block has reached the end of the galley, a finger 391 on the block strikes a bell 392 and warns the operator that the galley is full.

The frame 182 may be provided with removable cover plates to enclose the above described mechanisms, and the frame 182 may be hinged to the typographical composing and slug casting machine so as to be swung away therefrom when access to the mechanism of the typographical machine is desired.

It will be understood that variations and modifications may be made without departing from the scope of the invention. For example, instead of the slug 117 being drawn along the track 177 for cutting and stacking by means of the spring and chain mechanism described, a worm screw with speed controlling mechanism may be employed.

I claim:

1. A typographical composing machine having in combination an assembler slide, a bar attached to said slide, depending elements arranged on said bar at intervals in accordance with the width of sections of printed matter to be composed, and a cam surface arranged to be engaged successively by said depending elements and associated with an indicating device for facilitating the adjustment of said sections to exact width.

2. A typographical composing machine having in combination an assembler slide, a bar attached to said slide, spacing elements arranged on said bar at intervals in accordance with the width of sections of printed matter to be composed, an indicating device for facilitating the adjustment of said sections to exact width, clamping members at either end of said section and key controlled actuating elements for moving said clamping members into and out of operative position.

3. A typographical composing machine having in combination an assembler slide, a star wheel for assembling the matrices therein, an assembler brake, a bar attached to said slide, spacing elements arranged on said bar at intervals in accordance with the width of sections of printed matter to be composed, an indicating device for facilitating the adjustment of said sections to exact width, clamping members at either end of said section and key controlled actuating elements for moving said clamping members into and out of operative position, one set of key-controlled actuating elements actuating in succession, means for moving the star wheel out of position, means for swinging a clamping arm into position behind the last matrix, means for releasing the assembler brake and means for applying additional pressure to the assembled section.

4. A typographical composing machine having in combination an assembler slide, a bar attached to said slide, spacing elements arranged on said bar at intervals in accordance with the width of sections of printed matter to be composed, an indicating device for facilitating the adjustment of said sections to exact width, clamping members at either end of said section and key controlled actuating elements for moving said clamping members into and out of operative position, one of said clamping members being secured to a carriage slidable on said bar, said carriage being secured to one of said spacing elements during composition, actuation of one set of said key controlled actuating elements withdrawing said clamping member from operative position and releasing said carriage for return by spring means so that upon release of the controlling key the said clamping member is reintroduced into operative position into the assembler slide in advance of the next succeeding section to be composed.

5. A typographical composing machine having in combination an assembler slide, a star wheel for assembling the matrices therein, a bar attached to said slide, spacing elements arranged on said bar at intervals in accordance with the width of sections of printed matter to be composed, an indicating device for facilitating the adjustment of said sections to exact width, clamping members at either end of said section and key controlled actuating elements for moving said clamping members into and out of operative position, one of said clamping members being secured to a carriage slidable on said bar, said carriage being secured to one of said spacing elements during composition, actuation of one set of said key controlled actuating elements withdrawing said clamping member from operative position and releasing said carriage for return by spring means so that upon release of the controlling key the said clamping member is reintroduced into operative position into the assembler slide in advance of the next succeeding section to be composed, said carriage operating mechanism including means whereby said star wheel is moved to enable said clamping member to be reintroduced into operative position.

6. A typographical composing machine having in combination an assembler slide, a bar attached to said slide, depending elements arranged on said bar at intervals in accordance with the width of sections of printed matter to be composed, and a cam surface arranged to be engaged successively by said depending elements and associated with an indicating device for facilitating the adjustment of said sections to exact width, said spacing elements being recessed to enable them to clear said cam surface on return of the assembler slide.

7. A typographical composing and slug casting machine having in combination, assembling mechanism, means for presetting the widths of sections of matrices containing spacebands to be composed therein, an indicating device for facilitating the adjustment of said sections to exact width and justification mechanism for justifying each section independently, said mechanism including a justification bar arranged for horizontal and vertical adjustment.

8. A typographical slug casting machine equipped with means for casting a printing slug in a form definitive of sections of predetermined widths and having in combination a power-driven saw, mechanism for conveying the cast slug past the saw, mechanism for arresting said slug according to form in one or another of a series of different positions in relation to said saw, mechanism for moving said slug into and out of engagement with the saw to sever the same and means for subsequently continuing the movement of the severed slug.

9. A typographical slug casting machine equipped with means for casting a printing slug in a form definitive of sections of predetermined widths and having in combination, a transferring device for positively delivering the cast slug on to a track, a power-driven saw adjacent said track, mechanism for carrying said slug along said track and arresting the same according to form in one or another of a series of different positions in relation to said saw, and mechanism for moving said slug into and out of engagement with said saw.

10. A typographical slug casting machine equipped with means for casting a printing slug in a form definitive of sections of predetermined widths and having in combination, a transferring device for positively delivering the cast slug on to a track, a power-driven saw adjacent said track, mechanism for carrying said slug along said track and arresting the same according to form in one or another of a series of different positions in relation to said saw, mechanism for moving said slug into and out of engagement with said saw and means for subsequently continuing the movement of the severed slug.

11. A typographical slug casting machine equipped with means for casting a printing slug in a form definitive of sections of predetermined widths and having in combination, a transferring device for positively delivering the cast slug on to a track, a power-driven saw adjacent said track, mechanism for carrying said slug along said track and arresting the same according to form in one or another of a series of different positions in relation to said saw, and mechanism for moving said slug into and out of engagement with said saw, said slug being carried along said track by a pusher urged to carry the slug towards the saw by spring means and returnable by means of power-operated chain mechanism.

12. A typographical slug casting machine equipped with means for casting a printing slug in a form definitive of sections of predetermined widths and having in combination, a transferring device for positively delivering the cast slug on to a track, a power-driven saw adjacent said track, mechanism for carrying said slug along said track and arresting the same according to form in one or another of a series of different positions in relation to said saw, and mechanism for moving said slug into and out of engagement with said saw, said slug carrying mechanism including a pusher urged to carry the slug towards the saw by spring means and power-operated chain mechanism for returning the pusher to its starting position, said pusher being mounted on a carriage which is held by a latch in the slug receiving position of the pusher, the said latch being released as the transferring device delivers the slug to the track.

13. A typographical slug casting machine equipped with means for casting a printing slug in a form definitive of sections of predetermined widths and having in combination, a movable transferring device for positively delivering the cast slug on to a track, a power-driven saw adjacent said track, a pusher normally urged to move said slug along said track, said pusher being moved towards the transferring device to engage the slug as the transferring device is moved to receive the slug and being released to carry the slug towards the saw upon the transferring device delivering the same to the track, means for arresting said slug according to form in one or another of a series of different positions in relation to said saw and mechanism for moving said slug into and out of engagement with said saw to sever the same.

14. A typographical slug casting machine equipped with means for casting a printing slug in a form definitive of sections of predetermined widths and having in combination a power-driven saw, mechanism for conveying the cast slug past the saw, mechanism for arresting the said slug according to form in one or another of a series of different positions in relation to said saw, and mechanism for moving said slug into and out of engagement with the saw to sever the same.

15. A typographical slug casting machine equipped with means for casting a printing slug in a form definitive of sections of predetermined widths and having in combination a power-driven saw, mechanism for conveying the cast slug past said saw, a trip operated by said slug for arresting said slug according to form in one or another of a series of different positions in relation to said saw, mechanism for moving said slug into and out of engagement with said saw and means for subsequently continuing the movement of the severed slug.

16. A typographical slug casting machine according to claim 15 wherein a marking is cast on the slug by a special member inserted into the matrices during composition and wherein said trip is operated by said marking in arresting the slug in the form selected position.

17. A typographical slug casting machine having in combination a power-driven saw, means for carrying a cast slug upon a track past said saw, said track being provided with a movable side wall adapted to be moved towards and away from the saw by cam operated mechanism, and a trip operated by the slug for arresting the slug in position in relation to the saw and for actuating said cam operated mechanism.

18. A typographical slug casting machine having in combination a power-driven saw, means for carrying a cast slug upon a track past said saw, said track being provided with a movable side wall adapted to be moved towards and away from the saw by cam operated mechanism, a trip operated by the slug for arresting the slug in position in relation to the saw and for actuating said cam operated mechanism, and means for automatically disconnecting said cam operated mechanism after each severing operation.

19. A typographical slug casting machine having in combination a power-driven saw, means for carrying a cast slug upon a track past said saw, said track being provided with a resiliently mounted movable side wall portion adapted to be moved towards the saw by cam operated mechanism, a trip operated by the slug for arresting the slug in position in relation to the saw and for actuating said cam operated mechanism, and means for subsequently conveying the severed slug to a galley.

20. A typographical slug casting machine having in combination a power-driven saw, means for carrying a cast slug upon a track past said saw, said track being provided with a resiliently mounted movable side wall portion adapted to be moved towards the saw by cam operated mechanism, a trip operated by the slug for arresting the slug in position in relation to the saw and for actuating said cam operated mechanism, and a pusher device for conveying the severed slug to a galley.

21. A typographical slug casting machine having a power-driven saw adjacent a track, means for engaging a slug on said track with said saw whereby the same is severed into sections of predetermined length, a pusher device for conveying said severed slug sections to a galley, a stacker plate in said galley, the track being provided with a movable side wall opposite said stacker plate, mechanism for moving said side wall to stack said slug sections against said stacker plate, said mechanism being actuated by a trip controlled by the pusher device.

22. A typographical slug casting machine having a power-driven saw adjacent a track, means for engaging a slug on said track with said saw whereby the same is severed into sections of predetermined length, a pusher device for conveying said severed slug sections to a galley, a stacker plate in said galley, the track being provided with a resiliently mounted side wall portion movable towards said stacker plate and actuated by cam operated mechanism which is disconnected after each cycle of movement, said mechanism being actuated by a trip controlled by said pusher device.

23. A typographical slug casting machine according to claim 22, wherein said cam operated mechanism is connected to the power-driven shaft of the saw.

24. A typographical composing and slug casting machine having in combination assembling mechanism, means for presetting the widths of sections of matrices to be composed therein, an indicating device for facilitating the adjustment of said sections to exact width, special matrices for insertion at appropriate places to cast markings on the slugs so as to indicate the points where sections are to be severed, justification mechanism arranged to justify said sections independently, casting mechanism including a mould for casting a slug from said matrices, a power-operated transferring device for positively delivering said slug to a track, a power-driven saw adjacent said track, means for conveying said slug along said track, means for arresting the same in a predetermined position in relation to said saw, means for moving said slug into and out of engagement with said saw whereby the same is severed and means for conveying the severed sections to a galley and for stacking the same therein.

25. A typographical composing and slug casting machine having in combination means for casting a printing slug from a composed line of matrices in a form definitive of sections of predetermined widths, automatic mechanism for severing the cast slug into such sections, said mechanism comprising a power-driven saw, and means controlled by the form of the slug for locating it in one or another of a series of different severing positions in relation to the saw, and automatic means for delivering the slug after casting to said severing mechanism.

26. A typographical composing and slug casting machine according to claim 25 wherein the cast slug is characterized by a special non-printing element located on its printing edge at the point of severing and acting to locate the slug in a corresponding position in relation to the saw.

27. A typographical composing and slug casting machine according to claim 25 wherein the slug is severed into three or more sections, and wherein the locating means is caused to present the slug successively into different positions in relation to the saw for the severing operations.

28. A typographical composing machine including, in combination, an assembling slide, a bar attached to said slide, spacing elements arranged on said bar at intervals in accordance with the widths of sections of matrices to be composed in line, said spacing elements being positioned outside of the composed line, an indicating device for facilitating the adjustment of said matrix sections to exact width, said indicating device having an actuating part with reference to which the spacing elements are movable during composition of the line and which is arranged to be engaged and controlled in its actuation successively by said spacing elements, and means distinct from the spacing elements and distinct from the assembling slide for clamping a matrix section during adjustment in determining the exact width thereof.

29. A typographical composing machine according to claim 28, wherein the clamping means includes an abutment against which the matrix section may be moved in determining the exact width thereof.

30. A typographical composing machine according to claim 28, wherein the clamping means includes two abutments to engage the opposite ends of the matrix section, one of said abutments being movable toward the other to apply clamping pressure to the matrix section.

31. A typographical composing machine according to claim 28, wherein the clamping means includes two abutments to engage the opposite ends of the matrix section, one of said abutments being normally positioned in the line in advance of said matrix section and movable therewith during composition, and the other being insertable in the line after composition of said matrix section.

32. A typographical composing machine according to claim 28, wherein the clamping means includes an abutment normally positioned in the line in advance of the matrix section and movable forwardly therewith during composition.

33. A typographical composing machine including, in combination, an assembling slide, a bar attached to said slide, spacing elements arranged on said bar at intervals in accordance with the widths of sections of matrices to be composed in line, said spacing elements being positioned outside of the composed line, an indicating device for facilitating the adjustment of said matrix sections to exact width, said indicating device having an actuating part with reference to which the spacing elements are movable during composition of the line and which is arranged to be engaged and controlled in its actuation successively by said spacing elements, a star wheel for assembling the matrices in line and mounted for movement to and from its operative position, and an abutment insertable in the line after the matrix section has been composed and after the star wheel has been moved from its operative position.

HERBERT ELLIS.

REFERENCES CITED

The following references are of record in the file of this patent:

UNITED STATES PATENTS

| Number | Name | Date |
| --- | --- | --- |
| 886,583 | Degener | May 5, 1908 |
| 968,490 | Muehleisen | Aug. 23, 1910 |
| 1,115,155 | Archer | Oct. 27, 1914 |
| 1,287,900 | Curle | Dec. 17, 1918 |
| 1,308,733 | Curle | July 1, 1919 |
| 1,355,241 | Mohr | Oct. 12, 1920 |
| 1,377,820 | Ellis | May 10, 1921 |
| 1,442,368 | Sunderland | Jan. 16, 1923 |
| 1,633,996 | Narrow | June 28, 1927 |
| 1,859,116 | Sundstrom | May 17, 1932 |
| 1,941,748 | Holt | Jan. 2, 1934 |
| 2,020,269 | Williams | Nov. 5, 1935 |
| 2,095,004 | Morrison | Oct. 5, 1937 |